United States Patent [19]

Theriot

[11] 4,133,768
[45] Jan. 9, 1979

[54] FLOW CHOKE FILTER FOR OIL AND GAS WELLS

[76] Inventor: Joseph G. Theriot, 500 Jupiter St., Morgan City, La. 70380

[21] Appl. No.: 892,003

[22] Filed: Mar. 31, 1978

[51] Int. Cl.² ............................................. B01D 35/02
[52] U.S. Cl. ...................................... 210/452; 166/91; 210/459; 210/497 R
[58] Field of Search ............ 210/451, 452, 459, 497 R, 210/DIG. 10; 166/91, 227, 229, 235, 236

[56] References Cited

U.S. PATENT DOCUMENTS

| 2,004,071 | 6/1935 | Hannesschlager | 166/235 |
| 2,893,435 | 7/1959 | Eichenberg | 166/91 X |
| 3,009,519 | 11/1961 | Brown | 166/235 |
| 3,937,281 | 2/1976 | Harnsberger | 210/497.1 X |

Primary Examiner—William A. Cuchlinski, Jr.
Attorney, Agent, or Firm—Jack W. Hayden

[57] ABSTRACT

A flow choke filter for use with oil and gas wells wherein the flow choke has a sized passage for restricting fluid flow from a well and is seated in a housing that has an inlet for conducting well fluids to the inlet of the sized passage and an outlet for discharging well fluids from the flow choke sized passage and the housing, said filter having an elongated hollow body which is closed at one end and open at the other end. The hollow body is provided with an exterior surface in which recesses are formed with a longitudinally extending space between the recesses, such longitudinal space forming a surface between each recess which projects outwardly relative to the recesses in the body. A plurality of openings are provided in the bottom of the recesses for receiving flow from the well and conducting into the hollow body. Surface means on the hollow body sealably engages and positions the open end of the body to communicate with the sized passage of the flow choke so that fluid flow from the well is first conducted through the recess openings then to the sized passage in the flow choke.

5 Claims, 3 Drawing Figures

FLOW CHOKE FILTER FOR OIL AND GAS WELLS

SUMMARY OF THE INVENTION

Fluid flow from an oil and gas well is circulated upwardly through a well bore and into a well head at the top of the well bore at the earth's surface. The well fluids are circulated through a flow choke that is positioned in a housing which may be part of the well bore, such flow choke being provided with a longitudinally extending passage therethrough of a predetermined size so as to restrict fluid flow from the well. There are numerous reasons, well known to those skilled in the art, for employing such fluid flow choke to restrict the well fluid flow and the sized passage in such flow choke will vary depending upon the well and well fluid flow conditions.

Most well bores include debris which has collected in the well bore during the drilling and completion thereof, and when the well is flowed, such debris is circulated to the earth's surface and quite often restricts or completely blocks the sized passage through the flow choke, thus requiring that flow from the well be shut in while the flow choke is cleaned or replaced. Applicant is familiar with at least one screen arrangement which has been employed in connection with a flow choke with a view of filtering the flow from a well prior to passing it to the sized passage in the flow choke, but such arrangement has not generally proved acceptable because it clogs readily.

An object therefore, of the present invention is to provide a flow choke filter arrangement which can be readily positioned adjacent the flow choke and employed to filter fluid flow from an oil and gas well before passing it to the sized passage of a flow choke.

Yet a further object of the present invention is to provide a flow choke filter having a predetermined maximum flow area for use with a flow choke for an oil and gas well.

Yet a further object of the present invention is to provide a filter for an oil and gas well flow choke to separate debris from the fluid flow and thereby inhibit clogging of the flow choke with which the filter is associated, which filter is constructed and arranged to minimize interference with flow from the well to the choke as debris is collected on the filter.

Yet a further object of the present invention is to provide a filter for an oil and gas well flow choke to separate debris from the fluid flow and thereby inhibit clogging of the flow choke with which the filter is associated, which filter is constructed and arranged so that the debris may be collected thereon while not clogging the filter, or substantially reducing the flow through the filter to enable it to be employed over a relatively long period of time before shutting in the well to remove such filter for cleaning thereof.

Another object of the present invention is to provide a filter which may be used with flow chokes presently employed in oil and gas wells without requiring modification of such flow chokes. The filter is constructed and arranged so that it may be readily inserted into the housing in which the flow choke is received, and such filter secured and sealably seated with the flow choke for receiving fluid flow from oil and gas wells.

Other objects and advantages will become apparent from a consideration of the following drawings and description.

DESCRIPTION OF THE PREFERRED EMBODIMENT

Figure 1:
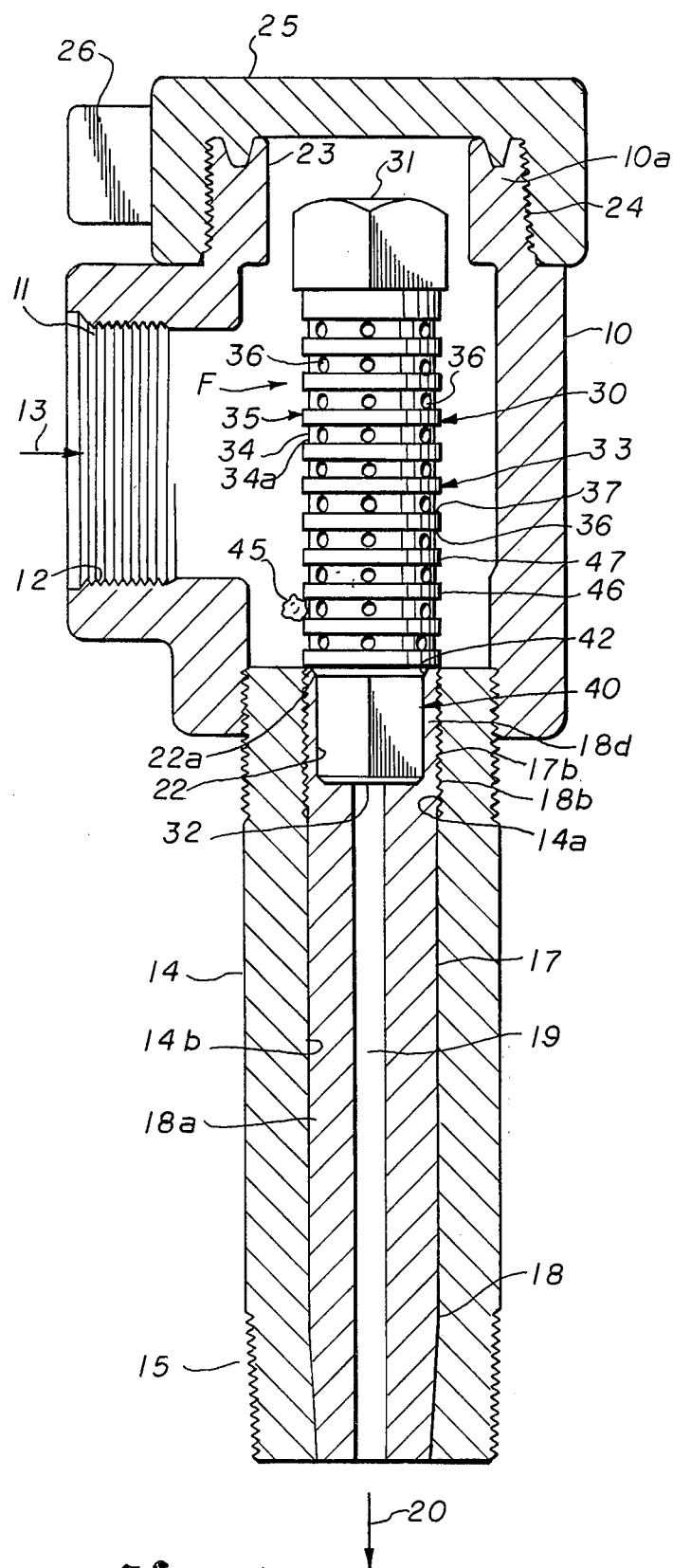
FIG. 1 is a sectional view showing a housing for a fluid flow choke for an oil and gas well such as commonly employed with the present invention seated therein.
Figure 3:
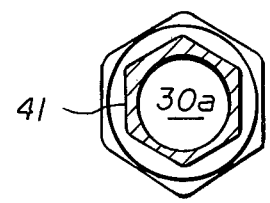
FIG. 3 is a sectional view on the line 3—3 of FIG. 2 illustrating further structural details of the present invention.
Figure 2:
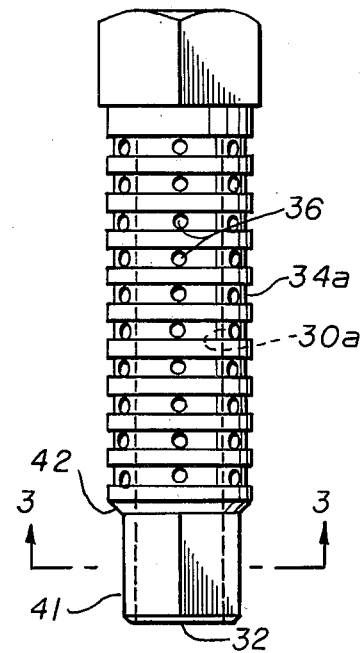
FIG. 2 is an elevational view of the preferred embodiment of the flow choke filter of the present invention.

Attention is first directed to FIG. 1 of the drawings wherein the present invention is illustrated generally by the letter F. A housing 10 is shown for connection with the well head or a flow line at the top of a well bore, such housing 10 being provided with an inlet 11 having threads 12 thereon whereby such housing may be connected with the well head or flow line in any suitable well known manner. The direction of flow into inlet 11 of the housing 10 is represented by the arrow 13.

The housing 10 includes an elongated tubular extension 14 which tubular extension is threaded at its outer end as shown at 15 for connection with a flow line with which the housing 10 is associated. Seated in the bore 17 of the elongated tubular housing 14 is a flow choke 18. The flow choke 18 includes an elongated body 18a which is provided with a restricted bore or sized passage 19 extending longitudinally therethrough. The sized passage 19 receives fluid flow from the inlet 11 in the housing 10 and discharges it from the sized passage 19 of the flow choke 18 to the discharge flow line represented by the arrow 20.

The choke body 18a is externally threaded as illustrated at 18b for threadedly engaging with the threads 14a formed within the counterbore 17b of the elongated tubular extension 14 on the housing 10. The annular tapered surface 17c at the end of the counterbore 17b and the mating surface 18c on the exterior of choke body 18a engage to sealably position the choke 18 in extension 14. A noncircular socket represented at 22 is normally provided within the end 18d of the body 18a of the flow choke 18 whereby the male end of a socket wrench may be engaged therewith to enable the flow choke 18 to be threadedly engaged in position in extension 14 and disengaged from the elongated tubular extension 14 when desired.

To this end, it will be noted that the housing 10 is provided with an opening 23 that is aligned with the elongated tubular extension 14 and external threads 24 are provided on the annular portion 10a of housing 10 adjacent the opening 23. A threaded nut 25 may be provided with projecting ears 26 so that such nut may be threadedly engaged with the portion 10a to close off the opening 23 and threadedly disengaged from the housing 10 for access to the flow choke 18 and filter F.

The sized bore or passage 19 in the flow choke 18 is determined by well conditions and flow in a manner well known in the art. It can be appreciated that one purpose of such sized passage is to restrict the flow from the well and to thereby lessen damage to the well caused by fluid flow therefrom. The size of the passage 19 may vary as desired and required.

The present invention illustrated by F, is shown in position in the housing 10 in FIG. 1.

The filter F of the present invention includes an elongated hollow body 30 which is closed at one end 31 and open at the other end 32. The body 30 includes a surface portion represented generally at 33 thereon in which recesses 34 are formed with a longitudinally extending space referred to generally at 35 provided between each of the recesses 34.

A plurality of spaced openings 36 are provided in the bottom 34a of each of the recesses 34 for receiving fluid flow from the well bore and conducting such fluid flow through the bore 30a in the elongated hollow body 30 for discharge into the sized passage 19 of choke 18. To assure proper communication of the fluid received within the bore 30a of the hollow tubular body 30 from the recesses 36 and into the sized passage 19, surface means as referred to generally at 40 are provided adjacent the other end 32 of filter body 30. Such surface means includes the end portion 41 which has longitudinally extending noncircular surface portions which are smaller in width than body 30 which fit in the noncircular opening or socket 22 formed in the end 18d of the choke body 18a, and an annular tapered surface 42 on filter body 30 sealably seats on the annular tapered portion 22a adjacent the outer end of the non-circular recess 22.

The spaces 35 project outwardly relative to the recesses 34 and as illustrated in the drawings, it will be noted that the recesses 34 and the space 35 therebetween extend transversely of the longitudinal axis of the elongated hollow body 30 of filter F. In some situations it may be desirable to provide recesses which extend longitudinally of the elongated body 30, in which event the recesses 35 therebetween would also extend longitudinally of the elongated body 30.

The spaces 35 provide outwardly projecting side surfaces 36 and 37 which extend from the bottom 34a of each recess preferably at right angles relative thereto and terminate at their intersection with the surface portion 33.

The recesses are of suitable extent or width as may be desired, as are the spaces 35 therebetween. The filter F as described herein enables fluid flow to be received from the well and conducted to the sized passage 19 of the flow choke 18 in a manner so as to lessen clogging of the filter F even though there may be an accummulation of debris on the outer surface portion 33.

For example, debris as illustrated at 45 as resting on and spanning the spaces designated 46, 47 between one of the recesses 34. Thus, even though debris is collected by the filter F, fluid flow may occur therearound and into the openings 36 in the various recesses 34.

The total area of the openings 36 and the recesses 34 should not exceed approximately one inch for effective filtration of the fluid prior to its entry into the sized passage 19 of the flow choke 18.

Should it become necessary or desirable for any reason to remove the filter F of the present invention, it is only necessary to remove the threaded nut 25 and engage the end 31 of the elongated body 30 with a socket wrench and pull it from within the housing 10. Its construction and arrangement enables it to be readily cleaned whereupon it can be reinserted into the housing and seated within the socket opening 22 adjacent the end of the flow choke 18. The cap 25 may then be reseated on the housing 10 and flow then continued through the arrangement.

The foregoing disclosure and description of the invention are illustrative and explanatory thereof, and various changes in the size, shape, and materials as well as in the details of the illustrated construction may be made without departing from the spirit of the invention.

What is claimed is:

1. In the flow line of an oil and gas well wherein a flow choke with a sized passage for restricting fluid flow from a well is seated in a housing that has an inlet for conducting well fluids to the inlet of the sized passage of the choke and an outlet for the discharge of fluids from the sized choke passage and housing, the invention of a removable filter for the sized passage of the choke comprising:

a. an elongated hollow body closed at one end and open at the other end for fitting in the housing;
   b. said hollow body having an exterior surface along its longitudinal axis in which recesses are formed having a bottom spaced inwardly of said exterior surface to form a longitudinally extending space between and above the bottom of the recesses, the longitudinal space including side surfaces extending upwardly from the bottom surface of the recesses to intersect said exterior surface;
   c. therebeing a plurality of openings in the recesses; and
   d. surface means on said elongated hollow body for sealably engaging with the flow choke whereby fluid flow from the well is first conducted through the recess openings into said body and then to the sized passage in the flow choke.

2. The invention of claim 1 wherein the surface means which sealably engages the flow choke is adjacent the end of said hollow body which is open.

3. The invention of claim 1 wherein said hollow body is tubular and the recesses and longitudinal spaces extend circumferentially of the hollow body.

4. The invention of claim 1 wherein the recesses and longitudinal spaces extend transversely of the hollow body.

5. The invention of claim 1 wherein the total area of the openings in the recesses is approximately one square inch.

* * * * *